Dec. 10, 1968  N. J. HARRICK  3,415,602
INTERNAL REFLECTION ELEMENT FOR MICRO-SAMPLE ANALYSIS
Filed Jan. 14, 1966  2 Sheets-Sheet 1

INVENTOR.
N. J. HARRICK
BY
AGENT 3,415,602
INTERNAL REFLECTION ELEMENT FOR
MICRO-SAMPLE ANALYSIS
Nicolas J. Harrick, Ossining, N.Y., assignor to North American Philips Co., Inc., New York, N.Y., a corporation of Delaware
Filed Jan. 14, 1966, Ser. No. 520,767
8 Claims. (Cl. 356—256)

This invention relates to a novel multiple pass internal reflection element for use in internal reflection spectrometry for the study or analysis of small quantities of a sample material.

In my prior publication in Analytical Chemistry, 36, 188–191 (January 1964), I describe different geometries of double pass, multiple reflection cells (hereinafter called "elements") for internal reflection spectrometry. In the double pass arrangement, the light beam undergoes twice the number of reflections and thus interactions with a sample material provided in extended form on the major surfaces of the double pass element, which is generally in the form of a thin plate. To utilize this double pass element properly, the sample should be provided in contact with as much of the surface as possible. This requires a certain amount of sample material. There is a need in the art for an element which can be employed to analyze extremely minute quantities of the sample material, an amount of material which is insufficient to cover the surface or a large fraction thereof of this prior art element. It is also known to use a hemicylinder and to reflect the beam once off the surface in contact with the sample, in which case only a small sample is necessary. However, the sensitivity is low, as only a single interaction is involved.

The principal object of my invention is to provide an internal reflection element geometry which will enable the light beam to strike a given point on the surface many times and thus the interaction of the light beam with a very minute quantity of the sample placed on that surface at the point of reflection can be enhanced by orders of magnitude, producing a corresponding enhancement of the sensitivity of the instrument.

This and other objects of the invention, as will appear hereinafter, are achieved by an internal reflection element provided with a series of reflecting surfaces arranged to continuously return the beam to the same point on the sampling suface at least two times. In a preferred embodiment, the reflecting elements are arranged in coacting pairs in a plane above and generally surrounding the sample surface, with one reflecting surface of each pair positioned to receive the beam from the sampling surface and direct it generally horizontally to the other reflector of the pair, which then returns it to the sampling surface.

The invention will now be described in greater detail with reference to the accompanying drawing wherein.

As is known from my above-mentioned publication and the literature cited therein, internal reflection spectroscopy is a recent improvement in infrared spectrophotometry, the pinciple of which is to direct the light or other radiation beam through a generally optically transparent material in such manner that it reflects at least once from a surface thereof, for which purposes the angle of incidence of the beam is chosen to exceed the critical angle $\theta_c$, where $$\theta_c = \sin^{-1}\left(\frac{n_{sample}}{n_{element}}\right)$$

and wherein $n_{sample}$ is the index of refraction of the sample material, and $n_{element}$ is the index of refraction of the element material. Generally one chooses for the element a material with a high index of refraction, such as semiconductors as germanium or silicon, or TlBr–TlI (KRS–5) or AgCl. If the sample material has an absorption band in the wavelength range of the light beam, then the total reflection is frustrated, and the usual infrared spectrum results, which can be employed, as is well known, to obtain information concerning the molecular structure of the sample material.

Figure 1:
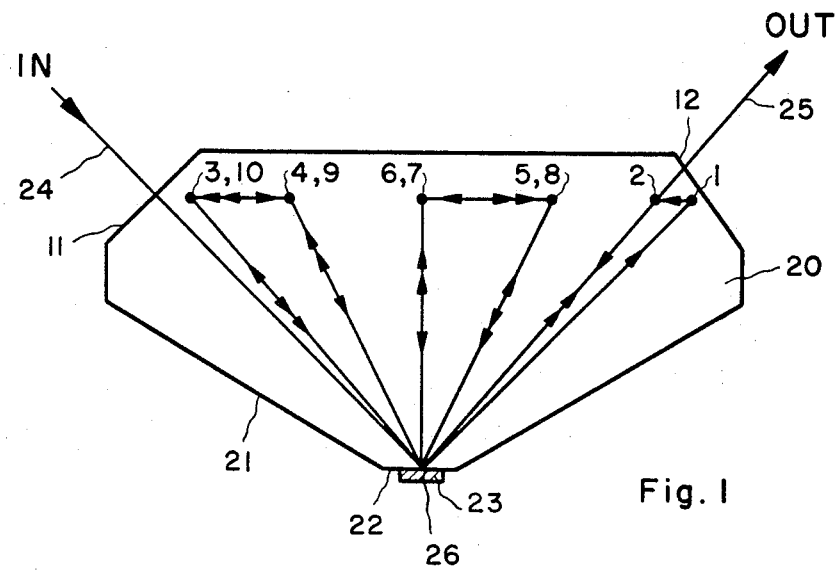
FIG. 1 is a partly schematic view of one form of multiple pass, internal reflection element in accordance with the invention.

My novel element employs the same principle in that it is constructed of an optically transparent material and has a receiving surface at one end for enabling an incident beam to enter into the structure to impinge upon a sampling surface at an angle exceeding the critical angle. As is illustrated in FIG. 1, the element is designated by reference numeral 20, and is provided with a truncated bottom portion 21 to form a sampling surface 22, on which is provided a sample of the material to be analyzed, designated 23 in the drawing. The incident beam is designated 24, and may be obtained in the usual way from a standard infrared spectrophotometer. Again, as in the usual way, the beam 25 derived from the element 20 is subsequently monochromatized and its intensity determined to produce a plot of beam intensity versus wavelength. In accordance with the present invention, the element is constructed in such a manner that the beam is circulated inside the internal reflection element 20 to continuously reflect from the same point on the sampling surface, to cause repeated interaction with the same sample portion, thus allowing micro-quantities of the sample material to be analyzed. As will be seen from FIG. 1, the incident beam 24 enters into the element 20 and reflects from the sampling surface 22, at the point 26, at an angle of incidence exceeding the critical angle and then is directed upwards onto a further reflecting surface 1 located generally in the plane above the sampling surface 22, indicated by the single arrow. The beam is directed then generally horizontally onto a second reflecting surface 2, from which it is then directed downward, indicated by the single arrow, onto the sampling surface 22 a second time at the same point as before at an angle exceeding the critical angle, from which it is reflected upward to a mirror 3, indicated by the single arrow. From the reflecting surface 3 it goes horizontally to the reflecting suface 4, indicated by the single arrow, and again, indicated by the single arrow, back onto the same point of the sampling surface at an angle exceeding the critical angle and thence upward to the reflecting surface 5, indicated by the single arrow. From the reflecting surface 5 it goes horizontally to the reflecting surface 6, indicated by the single arrow, and then downward to the sampling surface 22, indicated by the single arrow, and upward to the reflecting surface 7, indicated now by the double arrow. From the reflecting surface 7 it goes horizontally to the reflecting surface 8, indicated by the double arrow, and back to the sampling surface 22, indicated by the double arrow, and then up to the reflecting surface 9, as indicated by the double arrow. Thereafter, it goes horizontally to the reflecting surface 10, indicated by the double arrow, and back again to the sampling surface 22, indicated by the double arrow. After this last final reflection, it exits from the element 20 as an output beam 25, which is then processed in the usual manner. As will be noted, the beam has thus been reflected six times from the point 26 of the sampling surface. To bring the beam into and out of the element 20, the surfaces 11 and 12 of the element 20 are arranged to be substantially normal to the beam path. To obtain the reflecting surfaces, the surfaces of the element 20 are arranged so that the beam impinges thereon at an angle exceeding the critical angle producing total reflection. In other words, the beam is substantially normal on the incident surface 11 and the exiting surface 12, and is incident on the reflecting surfaces 1 through 10 inclusive at an angle exceeding the critical angle. In practice, the structure is a solid block of a transparent material, with the surfaces 1 through 12 constituting ground and polished planar facets arranged around the periphery of the upper section of the block in a plane extending above the sampling surface 22 in such manner as generally to surround the point of reflection on the sampling surface.

Figure 2:
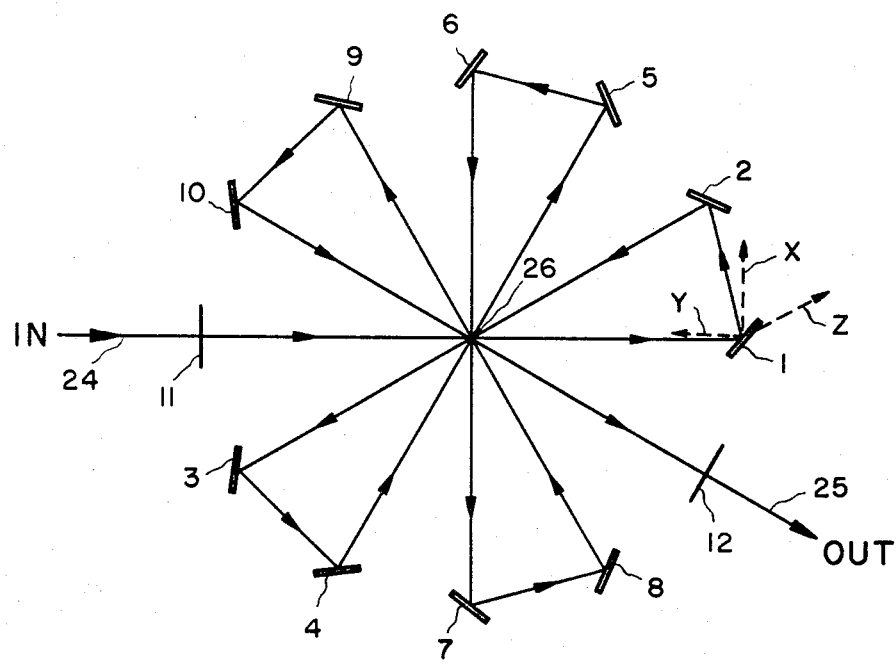
FIG. 2 is a schematic view illustrating the beam paths through the internal reflection element of FIG. 1.

FIG. 2 illustrates schematically, from a top view, the beam path just described in detail. As will be evident from the preceding description and more clearly from FIG. 2, the reflecting surfaces form pairs of coacting reflectors or mirrors. Thus, for example, the reflecting surface 1 functions to receive the beam from the sampling surface 26 and direct it horizontally to its coacting reflector 2, which redirects the beam downward to the sampling surface 26. The same applies to reflectors 3 and 4, and so on. Thus, the triangle formed by the points of reflection of the beam on the reflecting surfaces 1 and 2 and the point 26, is the same as all the other triangles formed by the corresponding points on the other pairs of reflecting surfaces 3-4, 5-6, 7-8 and 9-10 with the common reflection point 26. The orientations, therefore, of these reflecting surfaces which correspond for each of the pairs are the same relative to the point 26. Once the angular orientations or locations of one pair of reflecting surfaces is determined, then the orientations of all the other pairs becomes known.

A sample calculation for the reflecting pair 1-2 will make clear to those skilled in the art one simple technique using direction cosines for locating in space the positions of those mirrors. The starting point is a choice of the element material (index of refraction $n$ and critical angle $\theta_c$), the angle of incidence $\theta_i$ of the beam 24 on the sampling surface 22, a chosen height and diameter of the block 20, and the number of reflections from the same point 26 desired. The orientations of the planes of the reflecting surfaces are completely specified if the directions cosines of the normals to these planes are known. These are determined in the following way. For convenience, I choose reference axes X, Y and Z with the origin at the point of reflection on the first reflecting plane 1 (see FIG. 2) with the X–Y plane parallel to the sampling surface 22 (and thus in the plane of the drawing of FIG. 2) and the Z-axis perpendicular to the sampling surface 22 (and thus perpendicular to the plane of the drawing). The light beam after being reflected from the sampling surface at point 26 approaches the reflecting plane 1 in the Y–Z plane and the direction cosines of this incoming beam, $\lambda_1$, $\mu_1$, $\nu_1$ are determined and thus known as soon as the angle of incidence $\theta_i$ on the sampling surface is specified. After reflection from this oblique surface 1 the light beam travels in the V–Y plane to the coacting plane 2 with direction cosines $\lambda_2$, $\mu_2$, $\nu_2$. These latter direction cosines are determined by the choice of the number of passes, i.e., the number of reflections from the sampling surface, since the coacting plane 2 has an angular displacement from the reflection point 26 of $\pi/N$ from first plane 1 where N is the number of reflections. The angle between the incoming and reflected beam at the reflecting plane 1 is $2\theta$ where $\theta$ is the angle of incidence on the first oblique plane 1. It is well known that $$\cos 2\theta = \lambda_1\lambda_2 + \mu_1\mu_2 + \nu_1\nu_2 \quad (1)$$

therefore $\theta$ can be determined. We now can set up three equations involving the direction cosines $\lambda$, $\mu$, $\nu$ of the normal to the reflecting plane 1 from which they can be determined, viz.

$$\lambda\lambda_1 + \mu\mu_1 + \nu\nu_1 = \cos\theta \quad (2)$$
$$\lambda\lambda_2 + \mu\mu_2 + \nu\nu_2 = \cos\theta \quad (3)$$
$$\lambda^2 + \mu^2 + \nu^2 = 1 \quad (4)$$

These equations have been solved for the case of a germanium block ($\theta_c = 14.5°$), for example, with a horizontal spacing between the reflection points in opposing mirrors of about 5 cm., and a height from the sampling surface to the plane of the reflection points on the total reflecting surface of about 2.5 cm., in which the angle of incidence on the sampling surface is 45° and N=4 (note that in the illustrative embodiment of the drawing, N=6), namely:

$$\lambda = \cos\alpha = 0.5796$$
$$\mu = \cos\beta = 0.6836$$
$$\nu = \cos\gamma = -0.4436$$
$$\alpha = 54° \ 34\frac{1}{2}'$$
$$\beta = 46° \ 52'$$
$$\gamma = 116° \ 20'$$

where $\alpha$, $\beta$ and $\gamma$ are the angles between the normals to the reflecting plane 1 and the X, Y and Z axes, respectively. It is further noted that the Z axis is parallel to a vertical axis through the sampling point 26. These angles $\alpha$, $\beta$ and $\gamma$ determine the orientation of the first reflecting surface, and thus the orientation of every other first reflecting surface 3, 5, 7, 9 of each pair by angularly rotating the references axes by $2\pi/N$ about a vertical axis through the sampling point 26. These same angles also determine the orientation of the coacting reflecting surfaces 2, 4, 6, 8, 10 by simply choosing new reference axes with the positive direction of the X-axis now in the opposite direction. It is not essential that the radial distance from the point 26 to the reflecting point on these reflecting surfaces be the same. So long as the orientations of the reflecting surfaces relative to the point 26 are properly chosen, which is primarily determined by the chosen angle of incidence $\theta_i$ at the sampling point 26, then the beam will be returned to that sampling point 26. In such case, the previously-described triangles would be similar rather than identical. Nor, in fact, it is essential that the reflecting points lie substantially on a common horizontal plane, though this is preferred because the resultant symmetry simplifies the calculations and construction of the element. It is possible, for example, for each facet-reflecting surface to lie at a different level and at a different distance from the sampling point 26, provided that their orientations are chosen, theoretically or empirically, such that the beam received from the sampling point is displaced from its vertical plane to a different vertical plane which will enable it to retraverse the sampling point 26. This horizontal displacement of the plane formed by the incident and reflected beam paths from the sampling point 26 is, of course, essential to obtain plural traversals, as the entrance and exit surfaces 11 and 12 are normal to the beam whereas all the other facets provide total reflection of the beam. It will be further evident that it is not essential that the beam be confined to a single horizontal reflection before retraversing the sampling point 26. Multiple horizontal reflections are permissible, but should be minimized to conserve beam power.

Figure 3:
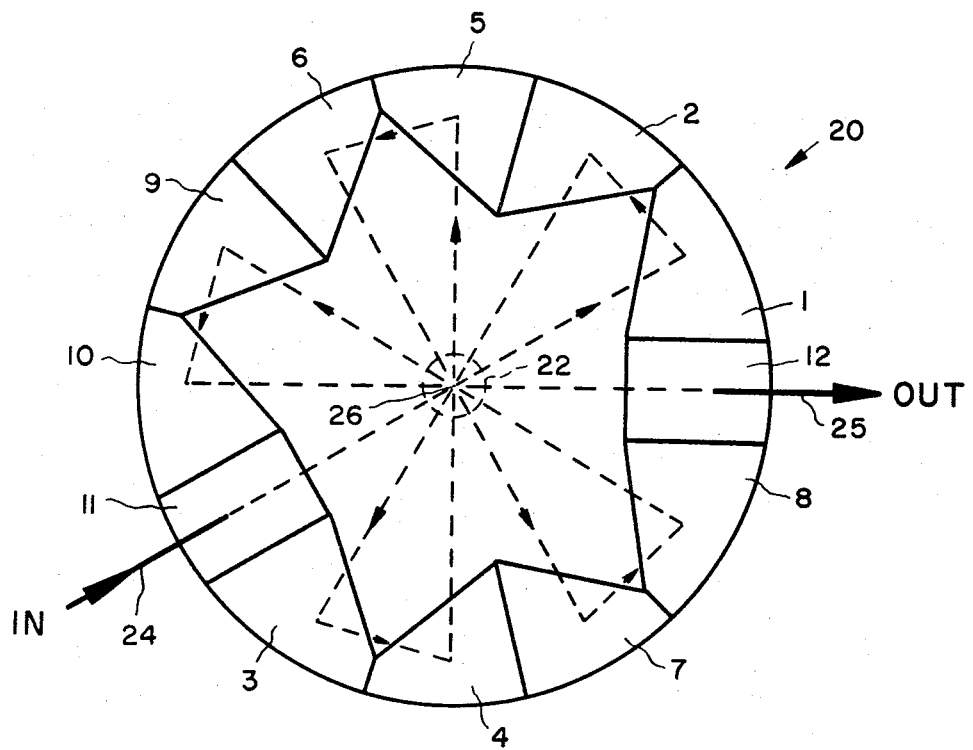
FIG. 3 is a top view of the form of my novel internal reflection element shown in FIG. 1.

In the manufacture of an element in accordance with the invention, one simply starts with a circular-cylinder, grinds the truncated conical portion 21 at the bottom to form the sampling surface 22, which should be polished to provide specular reflection, and then one simply machines and grinds in the upper structure the surfaces 1 through 12 at the proper angles as previously described. In a milling machine, for example, the element holder is titled to the position enabling the first reflecting surface 1 to be machined. The successive odd-numbered reflecting surfaces are thereafter machined by rotating the holder for each new surface $2\pi/N$ degrees. The reflecting surface 2 is machined by restoring the holder position for the surface 1, rotating $\pi/N$ degrees, and then simply modifying the tilt in the X direction, keeping the angle with respect to the Y axis the same, to the supplementary angle. Then, of course, the remaining even-numbered surfaces are machined by means of a $2\pi/N$ rotation for each new surface. The entrance and exit surfaces, for the case described, are at 45°. The resultant element has a rosette-like appearance. FIG. 3 is a top view of such an element. Each of the surfaces 1 through 12 are ground and polished planar surfaces in the upper portion of the block 20, the angles of which have already been given.

It is not necessary that the number of reflections be confined to the four reflections of the calculated case or the six illustrated in my preferred embodiment. Any number two or greater will provide an improvement over the prior art elements, which cannot achieve more than one reflection at the same point. The number of reflections is practically limited only by the width of the light beam, which determines the size of the individual reflecting surfaces, and the power requirements of the system.

The internal reflection element of my invention is not limited to the study of minute quantities of a sample, but also can be used with advantage generally where multiple reflections are desired, for example, in the case of samples exhibiting weak absorptions (bulk or thin films) or in the case where good physical contact is not easily achieved, as only a small physical contact is necessary to the internal reflection element over the sampling surface, actually only at the point of reflection 26.

While I have described my invention in connection with specific embodiments and applications, other modifications thereof will be readily apparent to those skilled in this art without departing from the spirit and scope of the invention as defined in the appended claims.

What is claimed is:

1. A multiple pass internal reflection element comprising a substantially optically transparent member having a receiving surface enabling an incident radiation beam to enter the member and having a sampling surface oriented relative to the incident beam so that the latter is incident thereon at an angle exceeding the critical angle for total internal reflection, said member including a plurality of reflecting surfaces oriented relative to the sampling surface and functioning in pairs to receive the beam reflected from the sampling surface at an angle exceeding the critical angle and to redirect it back onto substantially the same point of the sampling surface at an angle exceeding the critical angle, said member having an exiting surface oriented relative to the sampling surface to enable a beam incident on the existing surface to exit from the member.

2. An internal reflection element as set forth in claim 1 wherein the sampling surface is located at a bottom portion of the element, and the receiving, exiting and reflecting surfaces are arranged in a plane lying above the sampling surface.

3. A multiple pass internal reflection element comprising a block of substantially optically transparent material having in its upper portion a receiving surface oriented to enable an incident radiation beam to enter the block and having in its lower portion a sampling surface oriented relative to the incident beam such that the latter is incident substantially at a point thereon at an angle exceeding the critical angle for total internal reflection, said block including in its upper portion a plurality of reflecting surfaces arranged in pairs, one reflecting surface of each pair being oriented relative to the sampling surface such that the beam reflected from the latter is incident on said one reflecting surface at an angle exceeding the critical angle and is directed toward the other reflecting surface of said pair, said other reflecting surface of each pair being oriented relative to said one reflecting surface and the sampling surface such that the beam reflected therefrom is redirected back onto substantially the same point of the sampling surface at an angle exceeding the critical angle, whereby the beam circulates within the block by multiple total internal reflection from the reflecting surfaces and sampling surface, said block also having in its upper portion an exiting surface oriented relative to the sampling surface to enable a beam incident on the exiting surface to exit from the block.

4. An internal reflection element as set forth in claim 3 wherein the reflecting surfaces of each pair are arranged adjacent each other.

5. An internal reflection element as set forth in claim 4 wherein the beam paths formed by the reflection points at each pair of reflecting surfaces and the common point of the sampling surface define identical triangles.

6. An internal reflection element as set forth in claim 3 wherein the reflecting surfaces and the receiving and exiting surfaces are generally arranged in a common plane so as to surround the reflection point on the sampling surface.

7. An internal reflection element as set forth in claim 6 wherein the block has a generally cylindrical shape with a truncated lower portion, and with the reflecting, entrance and exiting surfaces constituting ground and polished flats around the periphery of the upper portion.

8. An internal reflection element as set forth in claim 3 wherein the reflecting surfaces define for the beam incident and reflected paths from the sampling surface that lie in plural vertical planes.

References Cited

UNITED STATES PATENTS 3,248,671   4/1966   Dill et al. _____ 331—94.5

FOREIGN PATENTS 1,347,714   11/1963   France.

JEWELL H. PEDERSEN, *Primary Examiner.*

F. L. EVANS, *Assistant Examiner.*

U.S. Cl. X.R.

350—286, 299; 356—51; 250—83